United States Patent
Mahmoud et al.

(10) Patent No.: US 10,631,133 B2
(45) Date of Patent: *Apr. 21, 2020

(54) TRACKING DEVICE LOCATION DETERMINATION IN A COMMUNICATIVELY-RESTRICTED ENVIRONMENT

(71) Applicant: Tile, Inc., San Mateo, CA (US)

(72) Inventors: Mohamed Sameh Mahmoud, San Mateo, CA (US); Muhammad Umair, Pleasanton, CA (US); John Mathew Depew, Sunnyvale, CA (US); Richard Philip Sillman, Los Altos, CA (US)

(73) Assignee: Tile, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/521,451

(22) Filed: Jul. 24, 2019

(65) Prior Publication Data
US 2019/0380007 A1 Dec. 12, 2019

Related U.S. Application Data

(63) Continuation of application No. 16/005,254, filed on Jun. 11, 2018, now Pat. No. 10,405,147.

(51) Int. Cl.
*H04W 4/029* (2018.01)
*H04W 4/80* (2018.01)
*H04W 4/02* (2018.01)
*H04W 64/00* (2009.01)
*G06F 16/29* (2019.01)

(52) U.S. Cl.
CPC ............ *H04W 4/029* (2018.02); *G06F 16/29* (2019.01); *H04W 4/023* (2013.01); *H04W 4/80* (2018.02); *H04W 64/00* (2013.01)

(58) Field of Classification Search
CPC ....... H04W 4/029; H04W 4/80; H04W 4/023; H04W 64/00; H04W 64/006
See application file for complete search history.

(56) References Cited

U.S. PATENT DOCUMENTS

| | | |
|---|---|---|
| 10,082,554 B1 | 9/2018 | de la Broise et al. |
| 10,405,147 B1 * | 9/2019 | Mahmoud ............. H04W 4/023 |
| 2007/0229350 A1 | 10/2007 | Scalisi et al. |

OTHER PUBLICATIONS

United States Office Action, U.S. Appl. No. 16/005,254, dated Mar. 4, 2019, 13 pages.

* cited by examiner

*Primary Examiner* — Diane D Mizrahi
(74) *Attorney, Agent, or Firm* — Fenwick & West LLP

(57) ABSTRACT

A tracking device has a first transceiver, a second transceiver, and control logic. The first transceiver can transmit a first tracking signal for locating the tracking device to mobile devices via a first network. The mobile devices provide the first tracking signal to a tracking server. The second transceiver can transmit a second tracking signal for locating the tracking device to the tracking server via a second network. The control logic can configure the tracking device in a first state in which the first transceiver transmits the first tracking signal, and the second transceiver is disabled and does not transmit the second tracking signal. In response to determining that the tracking device cannot connect to the tracking server via the first network, the control logic configures the tracking device in a second state in which the second transceiver is enabled and transmits the second tracking signal.

20 Claims, 10 Drawing Sheets

TRACKING DEVICE LOCATION DETERMINATION IN A COMMUNICATIVELY-RESTRICTED ENVIRONMENT

CROSS REFERENCE TO RELATED APPLICATIONS

This application is a continuation of U.S. application Ser. No. 16/005,254, filed Jun. 11, 2018, now U.S. Pat. No. 10,405,147, which is incorporated by reference in its entirety.

BACKGROUND

This disclosure relates generally to tracking devices, and more specifically, to locating a tracking device or when the tracking device is in a communicatively-restricted environment, such as out of range of mobile devices.

Electronic tracking devices have created numerous ways for people to track the locations of objects. For example, a user can attach a tracking device to an important object, such as keys or a wallet, and use the features of the tracking device to more quickly locate the object (e.g., if it becomes lost). In particular, the tracking device can emit a tracking signal that can be detected by one of a community of mobile devices. The location of a community mobile device that is within range of the tracking device and receives the tracking signal can be used to estimate the location of the tracking device. This location can be reported to the user's mobile device so that the user can find the lost object.

As community mobile devices move around, they enter and exit the ranges of tracking devices. However, if none of the community of mobile devices come within range of a lost tracking device, the user may be unable to find a lost object. Thus, current tracking devices are limited by the range of the tracking devices and the coverage provided by the community of mobile devices.

Figure 1:
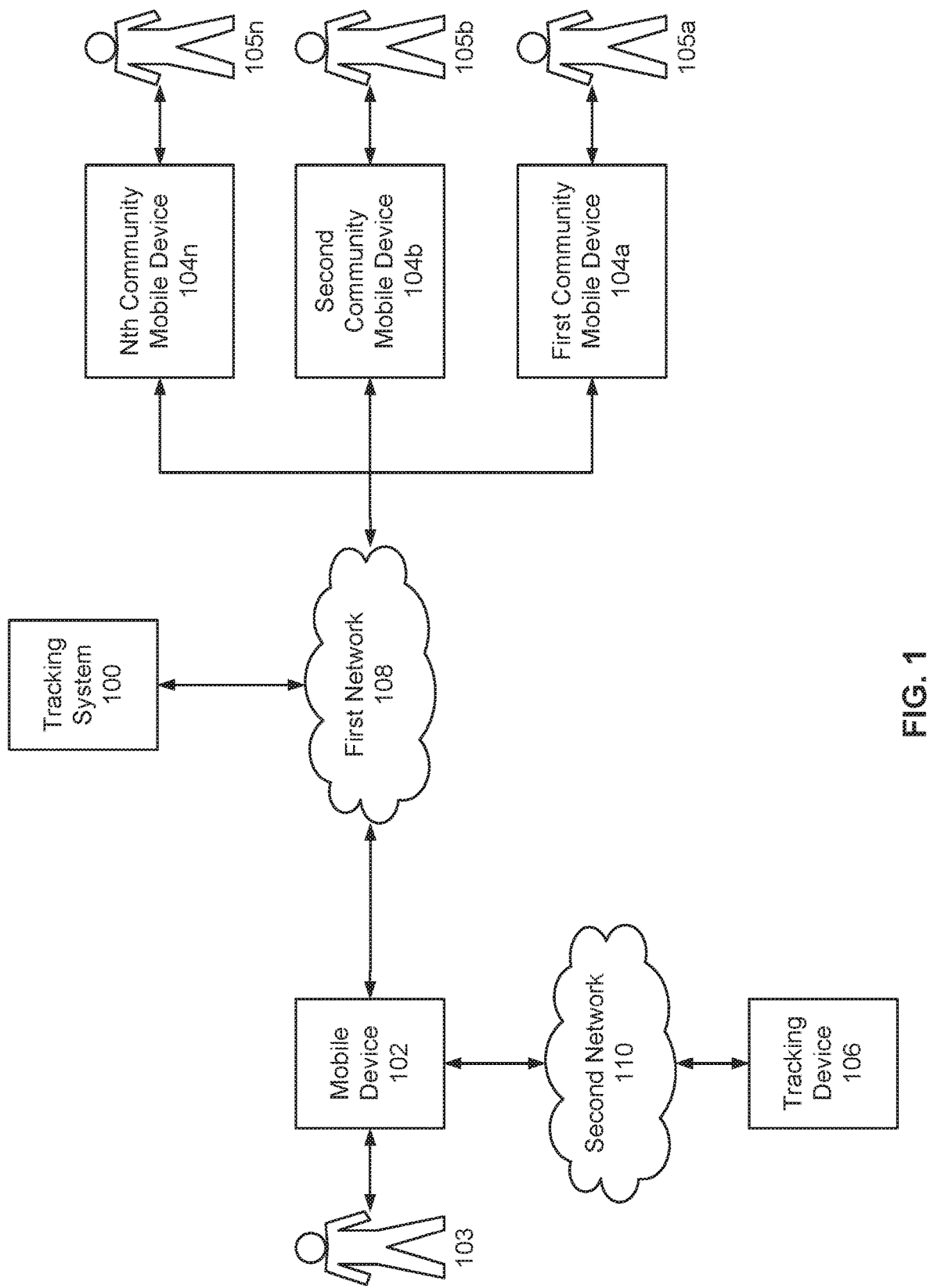
FIG. 1 illustrates an example tracking system environment in which a tracking device can operate, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment Overview

Embodiments described herein detail functionality associated with a tracking device. A user can attach a tracking device to or enclose the tracking device within an object, such as a wallet, keys, a car, a bike, a pet, or any other object that the user wants to track. Or, a tracking device can be a device with a primary purpose unrelated to tracking functionality (e.g., a set of headphones, an electronic key, a wireless speaker, a fitness tracker, a camera) that has an integrated tracking component that allows the device to be tracked. The user can then use a mobile device (e.g., by way of a software application installed on the mobile device) or other device or service to track the tracking device. For example, the mobile device can perform a local search for a tracking device. In situations where the user is unable to locate the tracking device using their own mobile device (e.g., if the tracking device is beyond a distance within which the mobile device and the tracking device can communicate), the user can leverage the capabilities of a community of users of a tracking device system.

A tracking system (also referred to herein as a "cloud server," "tracking server," or simply "server") can maintain user profiles associated with a plurality of users of the tracking system. The tracking system can associate each user within the system with one or more tracking devices associated the user (e.g., tracking devices that the user has purchased and is using to track objects owned by the user, or devices that include a tracking component and have additional non-tracking features). If the user's tracking device, or the object to which the tracking device is attached, becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate the lost tracking device. As used herein, "mobile device" can refer to a phone, tablet computer, or other connected device, and can also refer to systems typically not consider mobile, such as servers, routers, gateways, access points, and specialized systems configured to couple to tracking devices and report a location of the tracking devices.

As used herein, "tracking device" can refer to any device configured to communicate with another device for the purpose of locating the tracking device. Tracking devices can be specialized or single-purpose devices (e.g., self-contained devices that include circuitry or components to communicate with another device). However, "tracking device" as used herein can also refer to device or object with a different primary function but with secondary tracking device functionality. For example, a wireless speaker can include tracking device components that allow a user to track and/or locate the wireless speaker. In some embodiments, a tracking device platform can be established such that devices and objects that satisfy one or more criteria can act as tracking devices within a tracking device ecosystem. For instance, a tracking device provider can provide an SDK or custom chipset that, when incorporated into an object or device, enable the object or device to function as tracking devices, to communicate with other devices within the tracking device ecosystem, and to implement the functionalities described herein.

FIG. 1 illustrates an example tracking system environment in which a tracking device can operate, according to one embodiment. The environment of FIG. 1 includes a tracking system 100 communicatively coupled to a mobile device 102 associated with the user 103 via a first network 108. The tracking system 100 is also communicatively coupled to a plurality of community mobile devices 104a through 104n (collectively referred to herein as "community mobile devices 104") associated with a plurality of users 105a through 105n of the tracking system 100 (collectively referred to herein as "community users 105") via the first network 108. As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a first network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. In such embodiments, the mobile device 102 and community mobile devices 104 may only be able to communicate with the tracking device 106 if they are within a close proximity to the tracking device, though in other embodiments, the tracking device can use long-distance communication functionality (for instance, a GSM transceiver) to communicate with either a mobile device 102/104 or the tracking system 100 at any distance. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal or other measure of proximity to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. When the tracking device 106 is within range of the user's mobile device 102 and communicating directly with the mobile device 102, the tracking device 106 is in a "User Device Proximity" state.

If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106. When the tracking device 106 is outside the range of the user's mobile device 102 and the community mobile devices 104 are being used to locate the tracking device 106, the tracking device 106 is in a "Community Find" state.

As shown in FIG. 1 and as mentioned above, the tracking system 100 can communicate with a plurality of community mobile devices 104 associated with corresponding community users 105. For example, an implementation may include a first community mobile device 104a associated with a first community user 105a, a second community mobile device 104b associated with a second community user 105b, and additional communication mobile devices associated with additional community users up to an nth community mobile device 104n associated with an nth community user 105n. The community mobile devices 104 may also include functionality that enables each community mobile device 104 to identify a tracking device 106 within a proximity of the community mobile device 104. In one example, a first community mobile device 104a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bothering and without the knowledge of the first community user 105a.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may periodically transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102, though in some embodiments, the tracking device 106 can intentionally vary the transmission strength of the beacon signal. In some cases, the strength of signal or absence of a signal may be used to indicate that a tracking device 106 is lost.

In some situations, the user 103 is unable to locate the tracking device using either their own mobile device 102 or the community mobile devices 104. For example, if both the user's mobile device 102 and all of the community mobile devices 104 are beyond a distance within which the mobile devices 102 and 104 can communicate with the tracking device 106, the tracking device 106 cannot be located. Thus, neither the User Device Proximity state nor the Community Find state can provide a location for the tracking device 106. In such situations, the tracking device 106 can enter an alternate locating state that does not rely on the mobile device 102 or the community mobile devices 104 to locate the tracking device 106. In this alternate locating state, the tracking device 106 can sense its own location (e.g., using GPS) or sense information that can be used to determine its location (e.g., the identity of a Wi-Fi access point), and report this location information to the tracking system 100 by connecting to a network, e.g., a Wi-Fi network or a cellular network. This alternate locating state is referred to as a "Sense and Report" state. In the Sense and Report state, the tracking device 106 can be located even when the tracking device 106 is located outside the range of the mobile device and the community of users. However, the Sense and Report state consumes more power than transmitting tracking signals to the user's mobile device or the community of users consumes. Therefore, the tracking device is configured to control its state, switching into the Sense and Report state temporarily and under particular conditions. The Sense and Report state is described further with reference to FIGS. 6 through 10.

System Overview

Figure 2:
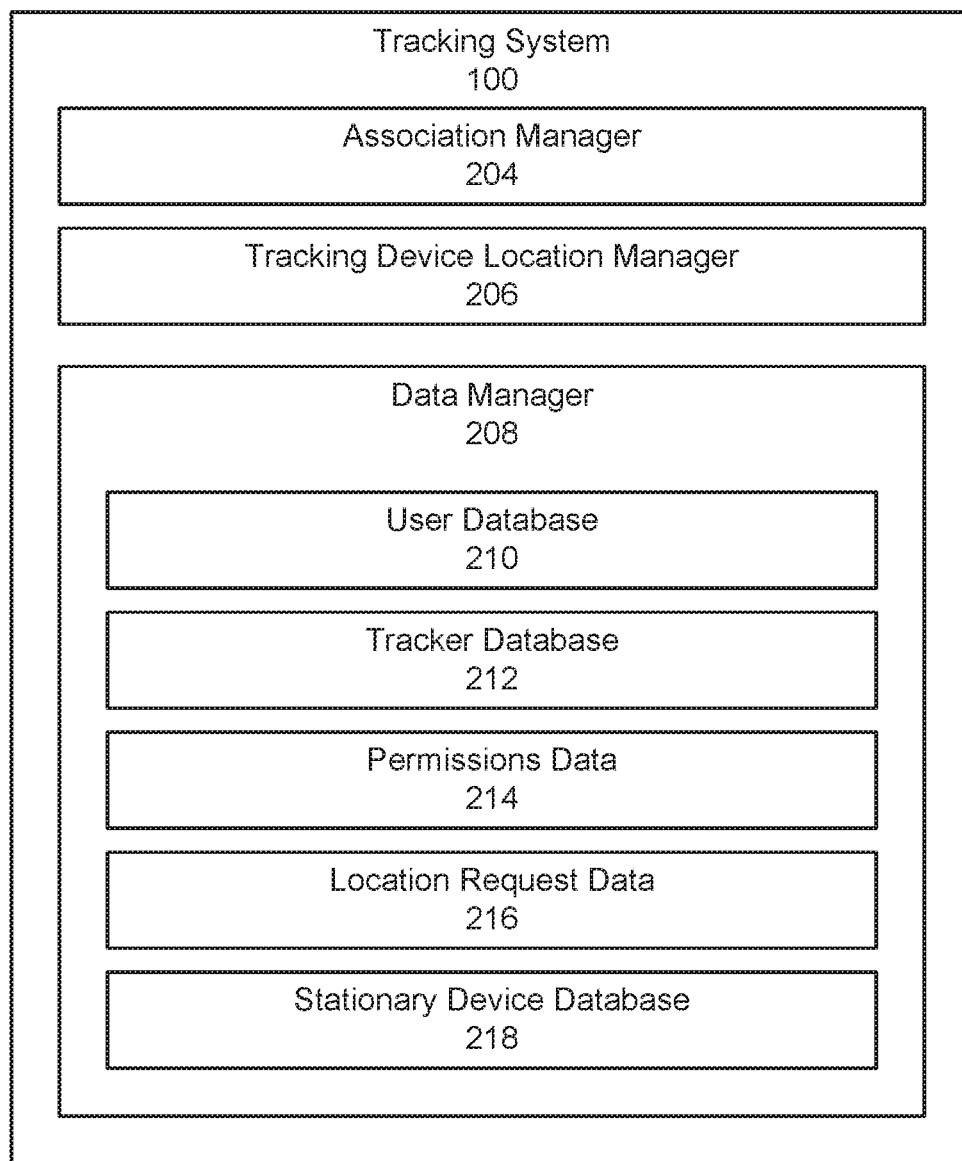
FIG. 2 illustrates an example tracking system for use in a tracking system environment, according to one embodiment.

FIG. 2 illustrates an example tracking system for use in a tracking system environment, according to one embodiment. As shown, the tracking system 100 may include, but is not limited to, an association manager 204, a tracking device location manager 206, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106.

The tracking device location manager 206 may also receive a location from one or more community mobile devices 104 that detect the tracking device 106, for instance in response to the community mobile device receiving a beacon signal transmitted by the tracking device 106, without the tracking device 106 having been previously marked as lost. In such embodiments, a user corresponding to the mobile device 102 can request a most recent location associated with the tracking device from the tracking system 100, and the location manager 206 can provide the location received from the community mobile device for display by the mobile device 102. In some embodiments, the location manager 206 provides the location of the tracking device 106 received from a community mobile device either automatically (for instance if the tracking device 106 is marked as lost) or at the request of a user of the mobile device 102 (for instance, via an application on the mobile device 102). The location manager 206 can provide a location of a tracking device 106 to a mobile device 102 via a text message, push notification, application notification, automated voice message, or any other suitable form of communication.

In some embodiments, the tracking device location manager 206 may receive a location, or information that the tracking system 100 can use to determine a location, from the tracking device 106 rather than from a community mobile device 104. As discussed further with respect to FIGS. 6 through 10, in the Sense and Report state, the tracking device 106 can transmit location information to the tracking system 100 via a network. The tracking device location manager 206 can provide the location of the tracking device 106 to the mobile device 102 as described above.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community mobile devices 104 that the tracking device 106 has been found, thus canceling any instructions associated with the previously provided location request. In some configurations, the notification that the tracking device 106 has been found may be provided automatically upon the mobile device 102 detecting the tracking device 106 within a proximity of the mobile device 102. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

In some embodiments, the tracking device location manager 206 also receives and processes instructions to cause the tracking device 106 to enter an alternate locating state, referred to herein as the "Sense and Report" state, in which the tracking device 106 determines its own location, or information that can be used to determine its location, and reports this location information to the tracking system 100. A lost indication from a mobile device 102 indicating that the tracking device 106 is lost may be accompanied by an instruction to request that the tracking device 106 enter the Sense and Report state. In other embodiments, when the tracking device location manager 206 receives a lost indication for a tracking device, the tracking device location manager 206 retrieves and evaluates rules for determining whether and when to instruct the tracking device 106 to enter the Sense and Report state. For example, the tracking device location manager 206 can determine that the tracking device 106 should enter the Sense and Report state after a period of time elapses in which the Community Find state fails to locate the tracking device. The Sense and Report state is described further with reference to FIGS. 6 through 10.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, location request data 216, and stationary device database 218. It will be recognized that although databases and data within the data manager 208 are shown to be separate in FIG. 2, any of the user database 210, tracker database 212, permissions data 214, location request data 216, and stationary device database 218 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate or receive a location of a tracking device 106. Location request data 216 may include information related to a location request or a lost indication received from the user 103 via a mobile device 102.

The data manager 208 may further include stationary device database 218. The stationary device database 218 stores location and identifying information for stationary devices, which can be used to locate the tracking device 206 when it is operating in the Sense and Report state. For example, the stationary device database 218 can store identifiers, such as service set identifiers (SSIDs) and/or media access control (MAC) addresses for Wi-Fi access points, along with locations for the corresponding access points, such as geographic coordinates and/or physical addresses. The stationary device database 218 can similarly store GSM Cell IDs (CIDs) and physical locations for cell towers.

In some embodiments, the tracking system 100 generates the stationary device database 218 based on data obtained from some or all of the mobile device 102 and the community mobile devices 104. The mobile devices 102 and 104 can report to the tracking system 100 their own locations (determined using GPS, indoor positioning, or other methods) and the SSIDs, MAC addresses, CIDs, or other stationary device identifiers of any stationary devices currently within their range. Based on the reports from the mobile devices 102 and 104, the tracking system 100 can estimate a geographic location for each stationary device and store the stationary device identifiers and estimated locations in the stationary device database 218. As stationary devices are added or moved, the tracking system 100 can update the stationary device database 218 based on new data.

In other embodiments, the tracking system 100 obtains the stationary device database 218 from a third party data provider. In some embodiments, the stationary device database 218 not stored locally by the tracking system 100, and instead, the tracking system 100 references a third party database to obtain locations corresponding to stationary devices.

Figure 3:
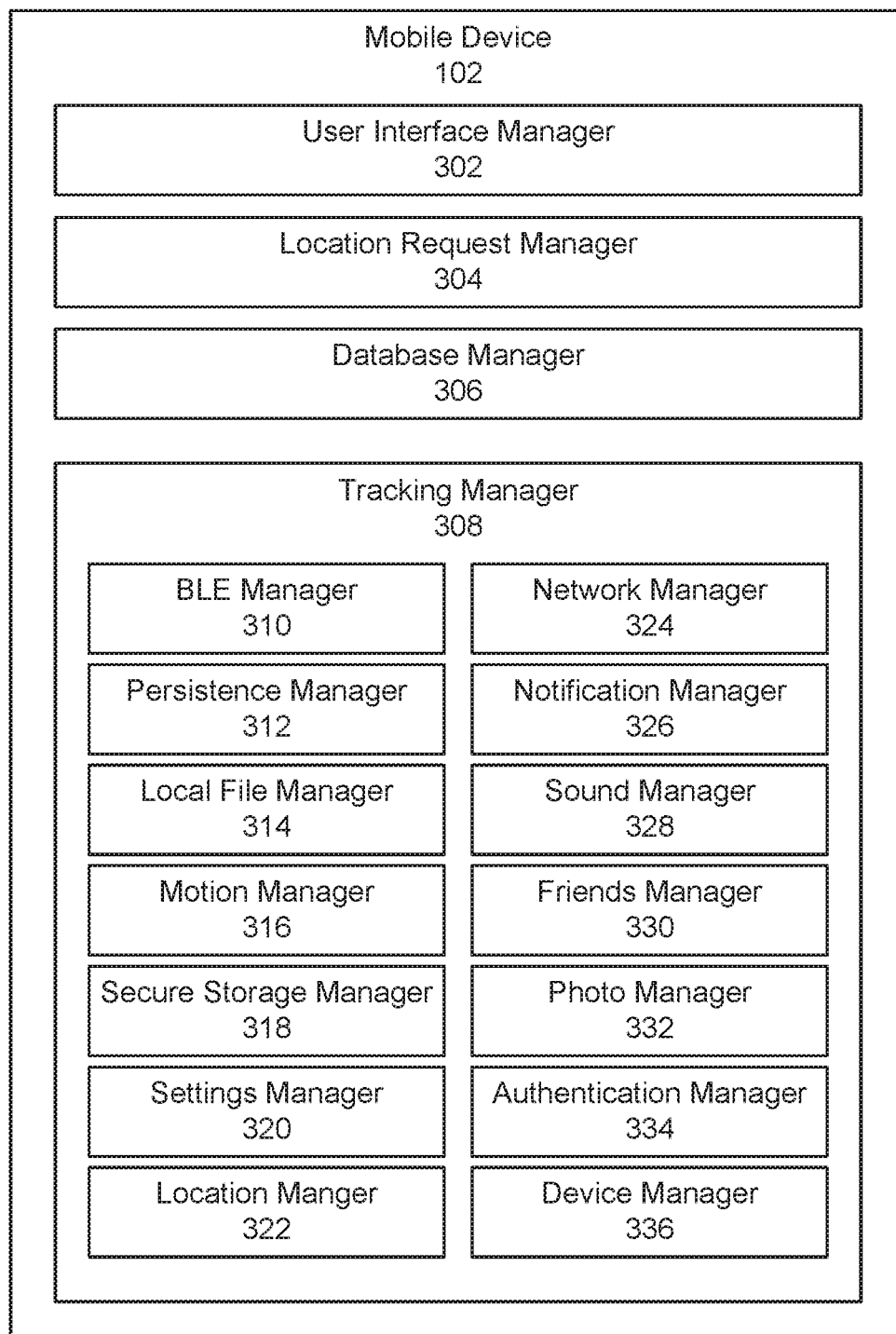
FIG. 3 illustrates an example user mobile device for use in a tracking system environment, according to one embodiment.

FIG. 3 illustrates an example user mobile device for use in a tracking system environment, according to one embodiment. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable from the mobile device 102 via the user interface manager 302, and the location request manager 304 may process the lost indication and provide any necessary data to the tracking system 100 for processing and relaying a location request to other users 105 and/or the tracking device 106 over a network 108. In some configurations, an indication that a tracking device 106 is lost is provided via user input. Alternatively, the indication may be transmitted automatically in response to the mobile device 102 determining that a tracking device 106 is lost.

In addition, the location request manager 304 can request a location of the tracking device 106 without the tracking device 106 being identified as lost. For instance, a user can access a tracking device location feature of an application running on the mobile device 102 (for example, via the user interface manager 302), and the location request manager 304 can request a most recent location of the tracking device 106 from the tracking system 100. The location request manager 304 can receive the most recent location from the tracking system 100, and can display the most recent location via the user interface manager 302.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a tracking system 100 and/or a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
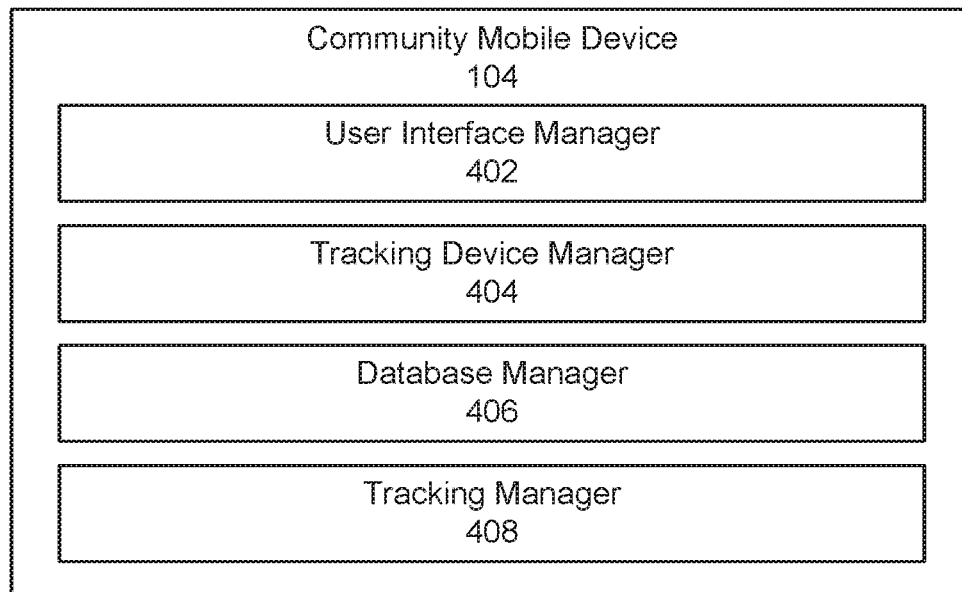
FIG. 4 illustrates an example community mobile device for use in a tracking system environment, according to one embodiment.

FIG. 4 illustrates an example community mobile device for use in a tracking system environment, according to one embodiment. As shown, the community mobile device 104 may include, but is not limited to, a user interface manager 402, a tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a tracking device manager 404. The tracking device manager 404 may facilitate scanning for nearby tracking devices 106. In some configurations, the tracking device manager 404 can continuously or periodically scan (e.g., once per second) for nearby tracking devices 106. The tracking device manager 404 may determine whether to provide an updated location of the nearby tracking device 106 to the tracking system 100. In some configurations, the tracking device manager 404 provides a location of a nearby tracking device 106 automatically. Alternatively, the tracking device manager 404 may determine whether the location of the tracking device 106 has been recently updated, and may determine whether to provide an updated location based on the last time a location of the tracking device 106 has been updated (e.g., by the community mobile device 104). For example, where the community mobile device 104 has provided a recent update of the location of a tracking device 106, the tracking device manager 404 may decide to wait a predetermined period of time (e.g., 5 minutes) before providing an updated location of the same tracking device 106.

In one configuration, the tracking device manager 404 may receive and process a location request or other information relayed to the community mobile device 104 by the tracking system 100. For example, the tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the tracking device manager 404 may generate and transmit a response to the location request to the tracking system 100, which may be provided to the user 103 associated with the tracking device 106. Further, generating and transmitting the response to the tracking request may be conditioned on the status of the tracking device 106 being flagged as lost by the mobile device 102 and/or the tracking system 100.

The tracking device manager 404 may additionally provide other information to the tracking system 100 in response to receiving the tracking request. For example, in addition to providing a location of the community mobile device 104, the tracking device manager may provide a signal strength associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the tracking device manager 404 may determine whether to send a location within the proximity of the tracking device 106 to the tracking system 100. The determination of whether to send a location to the tracking system 100 may be based on a variety of factors. For example, a tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Figure 5:
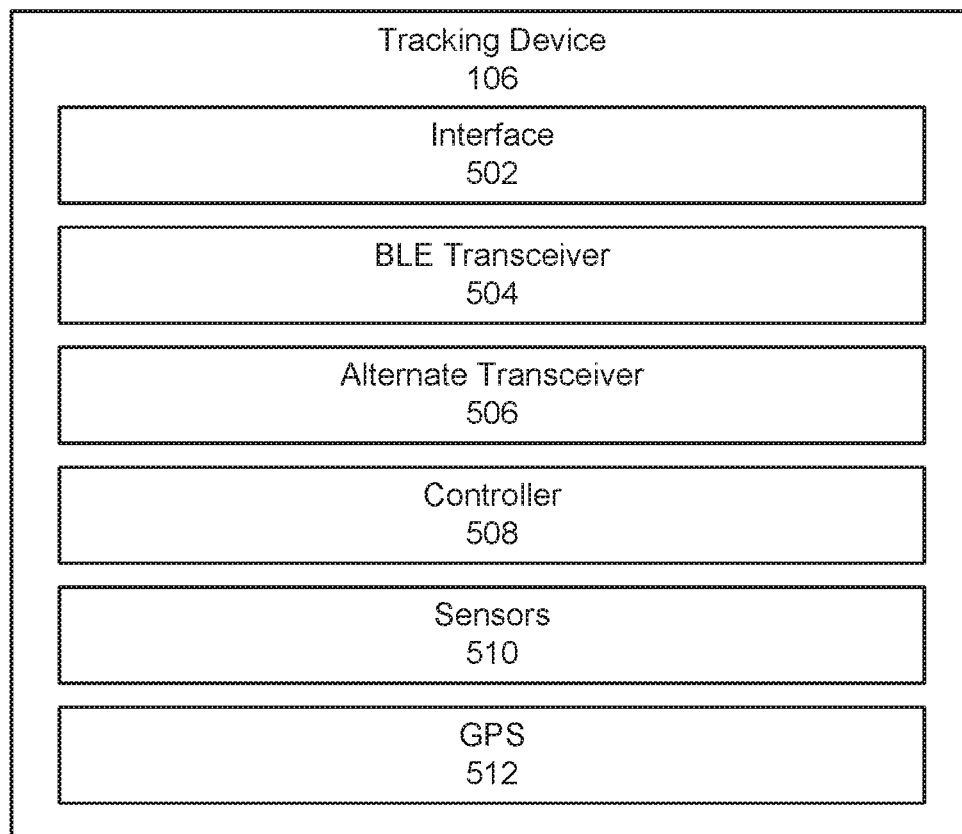
FIG. 5 illustrates an example tracking device for use in a tracking system environment, according to one embodiment.

FIG. 5 illustrates an example tracking device for use in a tracking system environment, according to one embodiment. The tracking device 106 of FIG. 5 includes an interface 502, a BLE transceiver 504, an alternate transceiver 506, a controller 508, one or more sensors 510, and a GPS unit 512. It should be noted that in other embodiments, the tracking device 106 includes fewer, additional, or different components than those illustrated in FIG. 5. For instance, tracking devices might not include the GPS unit 512 and can still implement some of the functionalities described herein. The BLE transceiver 504 and alternate transceiver 506 are hardware circuits capable of both transmitting and receiving signals over two different networks. In some embodiments, the tracking device 106 includes one or more additional transceivers for communicating over different, additional networks.

The interface 502 provides a communicative interface between the tracking device 106 and one or more other devices, such as a mobile device 102. For instance, the interface 502 can instruct the BLE transceiver 504 to output beacon signals as described above (for example, periodically or in response to a triggering event, such as a detected movement of the tracking device 106). In response to the receiving of signals by the BLE transceiver 504 from the mobile device 102, the tracking device 106 can enter the User Device Proximity state, in which the interface 502 manages a pairing protocol to establish a communicative connection between the tracking device 106 and the mobile device 102 using the BLE transceiver 504. In some embodiments, instead of a BLE transceiver 504, another type of transceiver, such as another type of low-energy transceiver or a Bluetooth transceiver, is used for pairing with the mobile device 102 and transmitting beacon signals.

The interface 502 can also provide a communicative interface between the tracking device 106 and one or more other devices using the alternate transceiver 506. The alternate transceiver 506 is used when the tracking device 106 enters the Sense and Report state, such as when the tracking device 106 is in a communicatively restricted environment. The alternate transceiver 506 can be configured to receive and transmit signals using a different wireless connection protocol from the BLE transceiver 504, so the alternate transceiver 506 accesses a different network and different devices from the BLE transceiver 504. For example, the alternate transceiver 506 can be a WiFi transceiver or a Global System for Mobile Communications (GSM) transceiver.

The controller 508 is a hardware chip that configures the tracking device 106 to perform one or more functions or to operate in one or operating modes or states. For instance, the controller 508 can configure the interval at which the BLE transceiver 504 broadcasts beacon signals, can authorize or prevent particular devices from pairing with the tracking device 106 based on information received from the devices and permissions stored at the tracking device, can increase or decrease the transmission strength of signals broadcasted by the transceivers 504 and 506, can configure the interface to emit a ringtone or flash an LED light, can enable or disable various tracking device sensors, can enable or disable a tracking device GPS unit, can enable or disable communicative functionality of the tracking device 106 (such as a GSM transmitter and receiving), can configure the tracking device into a sleep mode or awake mode, can configure the tracking device into a power saving mode, and the like. The controller 508 can determine the operating state for the tracking device (e.g., User Device Proximity, Community Find, or Sense and Report) and adjust the functionality of the tracking device accordingly, e.g., by selectively enabling and disabling the transceivers 504 and 506. The controller 508 can configure the tracking device to perform functions or to operate in a particular operating mode based on information or signals received from a device paired with or attempting to pair with the tracking device 106, based on an operating state or connection state of the tracking device 106, based on user-selected settings, based on information stored at the tracking device 106, based on a detected location of the tracking device 106, based on historical behavior of the tracking device 106 (such as a previous length of time the tracking device was configured to operate in a particular mode), based on information received from the sensors 510 or the GPS 512, or based on any other suitable criteria.

The sensors 510 can include motion sensors (such as gyroscopes or accelerators), altimeters, orientation sensors, proximity sensors, light sensors, or any other suitable sensor configured to detect an environment of the tracking device 106, a state of the tracking device 106, a movement or location of the tracking device 106, and the like. The sensors 510 are configured to provide information detected by the sensors to the controller 508. The GPS unit 512 is configured to detect a location of the tracking device 106 based on received GPS signals, and is configured to provide detected locations to the controller 508.

Locating the Tracking Device in a Communicatively-Restricted Environment

Figure 6:
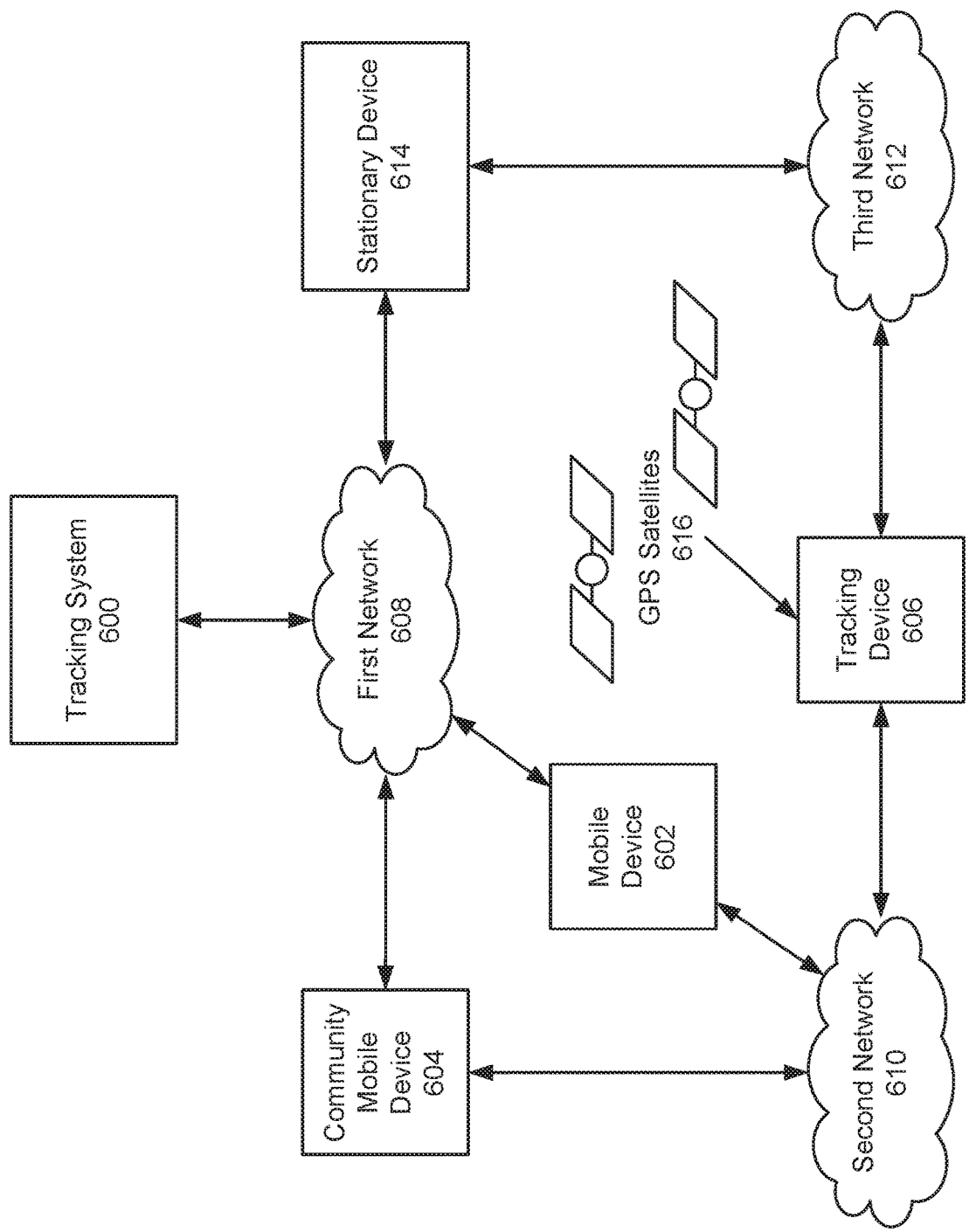
FIG. 6 illustrates an environment for a tracking device that can be located in a communicatively-restricted environment, according to one embodiment.

FIG. 6 illustrates an environment for a tracking device 606 that can be located in a communicatively-restricted environment, according to one embodiment. The environment includes a tracking system 600, a mobile device 602 associated with the tracking device 606, a community mobile device 604, a stationary device 614, and GPS satellites 616. The environment also includes three networks 608, 610, and 612. The tracking system 600, mobile device 602, community mobile device 604, tracking device 606, first network 608, and second network 610 are similar to the tracking system 100, mobile device 102, community mobile device 104, tracking device 606, first network 108, and second network 110 described with respect to FIGS. 1 through 5. For example, the tracking device 606 includes the components described with respect to FIG. 5, and the tracking system 600 includes the components described with respect to FIG. 2. The tracking system 600 can associate the mobile device 602 and/or a user of the mobile device 602 with the tracking device 606, e.g., using an association manager, as described above with respect to FIGS. 1 and 2.

In the embodiment shown in FIG. 6, the tracking device 606 can communicate over the second network 610 (e.g., a BLE network) using a first transceiver (e.g., the BLE transceiver 504). The second network 610 allows the tracking device 606 to communicate with one or more mobile devices, such as the mobile device 602 (e.g., in the User Proximity State) or the community mobile device 604 (e.g., in the Community Find state). The mobile devices 602 and 604 can provide location information about the tracking device 606 to the tracking system 600 via the first network 608. Based on the location of the tracking device 606 relative to the mobile device 602 and one or more community mobile devices 604, the tracking device 606 can be out of range of any of the mobile devices 602 and 604, and thus unable to connect to the mobile devices 602 and 604 over the second network 610. So that the tracking device 606 may still be located when it is out of range of the mobile devices 602 and 604, the tracking device 606 is also equipped to communicate over the third network 612 using the alternate transceiver 506. The third network 612 allows the tracking device 606 to communicate with one or more stationary devices 614. The stationary device 614 transmits location information received from the tracking device 606 to the tracking system 600 via the first network 608. The tracking system 600 in turn can provide location information received from the tracking device 606 to the mobile device 602 via the first network 608 to help the user find the tracking device 606. The third network 612 serves as an alternate network that the tracking device 606 can use to provide location information the tracking system 600. In some embodiments, the third network 612 is the same network as the first network 608, e.g., the first and third networks 608 and 612 may both be the Internet, and the stationary device 614 is a router for directing packets between the tracking system 600 and the tracking device 606.

In some embodiments, the tracking device 606 determines its own location based on signals received from the GPS satellites 616. In particular, the GPS 512 in the tracking device 606 determines the location of the tracking device 606. Other satellite positioning systems can be used, such as GLONASS, Beidou, or Galileo, or indoor positioning technology can be used. In some embodiments, the tracking device 606 uses additional sensors 510, such as an inertial measurement unit, to determine its location.

In some embodiments, the tracking device 606 additionally or alternatively retrieves information that the tracking device system 600 can use to determine or estimate the location of the tracking device 606. For example, the tracking device 606 can gather identifying information transmitted by one or more stationary devices 614 and transmit the identifying information of the stationary devices 614 to the tracking system 600 via one of the stationary devices 614. The tracking device 606 can also gather ranging information for the stationary devices 614 (e.g., based on time-of-flight or strength of a signal transmitted by a stationary device) and transmit this information to the tracking system 600. The tracking system 600 can look up a location associated with each stationary device 614 in the stationary device database 218. If the tracking device 606 provides identifiers for more than one stationary device, the tracking system 600 can calculate a location based on the locations and ranging information, if available. If the tracking device 606 provides only one identifier for a stationary device, the tracking system 600 can use the location of the stationary device as an estimate for the location of the tracking device 606.

Figure 7A:
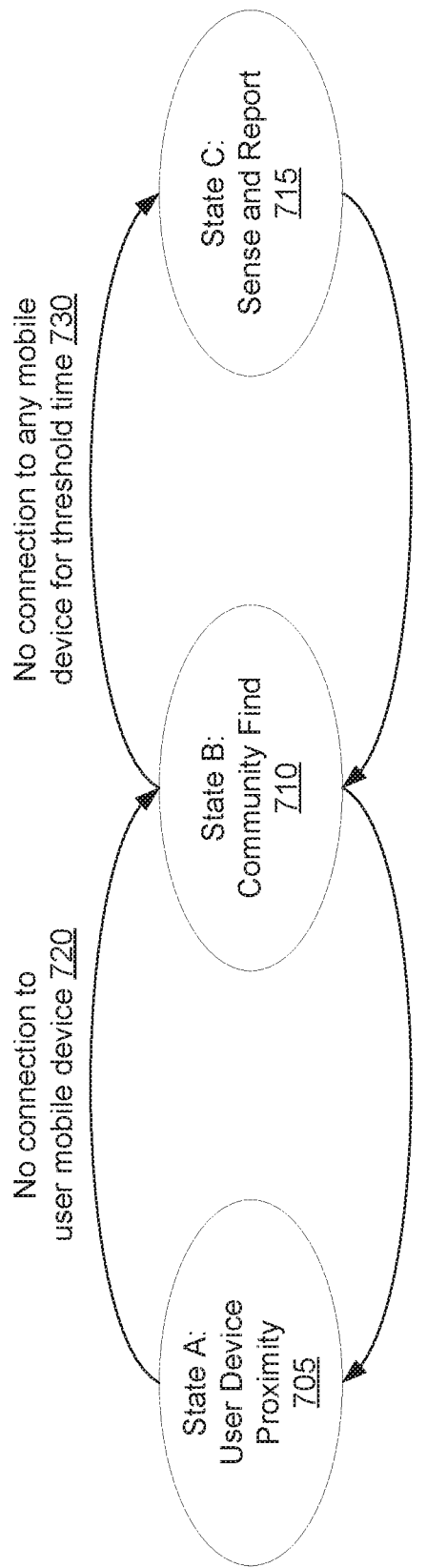
FIG. 7A is a state diagram for a tracking device that enters an alternate locating state after detecting that it is in a communicatively-restricted environment, according to one embodiment.
Figure 7B:
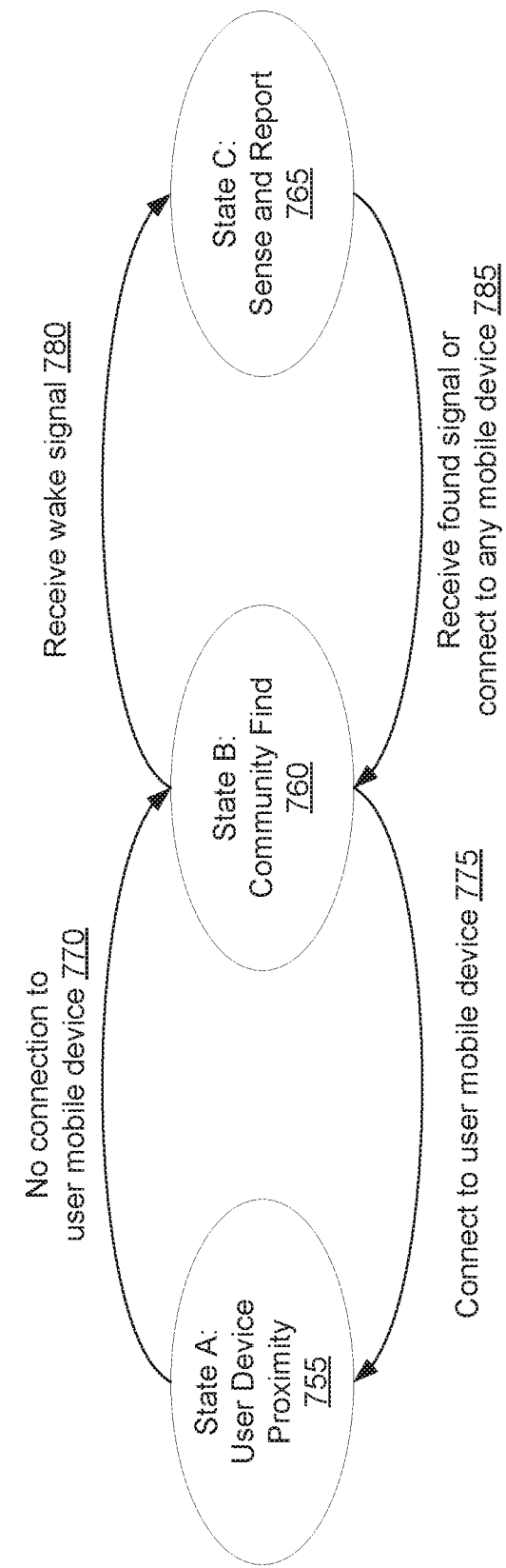
FIG. 7B is a state diagram for a tracking device that enters an alternate locating state in response to a wake signal, according to one embodiment.

While the alternate transceiver 506 allows the tracking system 600 to determine the location of the tracking device 606 even when the tracking device 606 is not within range of the mobile device 602 or the community mobile devices 604, the alternate transceiver 506 can consume significantly more power than the BLE transceiver 504. It is convenient for the tracking device 606 to have a small overall form factor (e.g., a size that could conveniently fit on a keyring, in a wallet, etc.) and thus a small battery. In addition, it is convenient for the user to not have to regularly change or recharge the battery of the tracking device 606. While the BLE transceiver 504 can be powered for a relatively long time (e.g., a year or longer) by a relatively small battery, other types of transceivers (e.g., GSM or Wi-Fi transceivers) cannot be continually powered by a small battery without frequent recharging or replacing. Therefore, the controller 508 of the tracking device 606 includes intelligence for determining whether to enable and use the alternate transceiver 506. For example, the tracking device 606 can be represented as a state machine that only enters a state in which the alternate transceiver 506 is used under certain conditions. FIGS. 7A and 7B show state diagrams for two embodiments of the tracking device 606.

FIG. 7A is a state diagram for a tracking device that enters an alternate locating state after detecting that it is in a communicatively-restricted environment, according to one embodiment. The state diagram shows three states: State A: User Device Proximity 705, State B: Community Find 710, and State C: Sense and Report 715. The state diagram also shows the conditions for the tracking device 606 to transition between the three states 705, 710, and 715.

As described above, in State A: User Device Proximity 705, the tracking device 606 is within range of the user's mobile device 602 and can communicate directly with the mobile device 602, e.g., using the BLE transceiver 504. In this state, the BLE transceiver 504 is enabled, and the alternate transceiver 506 is disabled. For example, the alternate transceiver 506 can be turned off or can be in a low-power mode.

If the controller 508 determines that the tracking device 606 has no connection to the user mobile device 602, the controller 508 transitions 720 to State B: Community Find 710. As described above, in the Community Find state, the tracking device 606 uses the community mobile devices 604 to provide a location for the tracking device 606. For example, the tracking device 606 can transmit a beacon signal, e.g., at regular intervals or in response to detecting movement. If a community mobile device 604 receives the beacon signal, the community mobile device 604 provides location information for the tracking device 606 to the tracking system 600. The community mobile device 604 provides a confirmation to the tracking device 606 that the beacon signal was received by the community mobile device 604.

If the tracking device 606 re-connects to the user's mobile device 602, the controller 508 transitions 725 back to State A: User Device Proximity 705. While the tracking device 606 remains in State B: Community Find 710, the controller 508 monitors the length of time during which the tracking device 606 has been unable to connect to the mobile device 102 or any community mobile device 104. If the controller 508 determines that there has been no connection to any mobile device for greater than a threshold length of time, so that the tracking device 606 is in a communicatively-restricted environment, the controller 508 transitions 730 to State C: Sense and Report 715.

As described above, in the Sense and Report state 715, the tracking device 606 senses its own location, or information that can be used to determine its location, and reports this location information to the tracking system 600 by using the alternate transceiver 506 to connect to a stationary device 614 via the third network 612. At the transition to State C, the controller 508 may enable the alternate transceiver 506 and use the alternate transceiver 506 and any location-determining components (e.g., the sensors 510 and GPS unit 512), use the alternate transceiver 506 and/or the sensors 510 and/or the GPS unit 512 to gather location information, and transmit the location information using the alternate transceiver to the tracking system 600. The alternate transceiver 506 and any additional locating components can stay enabled throughout State C (e.g., to continually provide current location information to the tracking system 600). Alternatively, the controller 508 can disable the alternate transceiver 506 and/or any additional locating equipment after transmitting the location information (e.g., to preserve battery), and re-enable the alternate transceiver 506 and/or any additional locating equipment at periodically intervals while the tracking device 606 is in State C. The BLE transceiver 504 may stay enabled during State C and continue transmitting beacon signals and looking for confirmation signals to determine whether the tracking device 606 can transition back to State B.

To determine whether to transition 730 to State C, the controller 508 can store a reference time for the last time the tracking system 600 received a current location. For example, the controller 508 can store receipt time for the most recent confirmation signal received from a community mobile device 604. Whenever the tracking device 606 receives a confirmation signal, the controller 508 can update the stored last-receipt time. The controller 508 compares the stored last-receipt time to a current time to determine whether a threshold length of time has passed. If a threshold length of time has passed without receiving a confirmation signal, the controller 508 transitions 730 to State C.

If the tracking device 606 transmits beacon signals in response to movement, an alternate process can be used. For example, the controller 508 can store a first reference time for the last time the tracking device 606 received a confirmation signal from a community mobile device 604, and a second reference time for a time that the tracking device 606 detects movement after the last confirmation signal. The second reference time may be a time when the tracking device 606 detected any movement, or a magnitude of movement above a particular threshold. If the tracking device 606 has detected movement at a time later than the last confirmation signal, this indicates that the tracking system 600 no longer has the current location of the tracking device 606. If the tracking device 606 receives a confirmation signal after the last movement (i.e., the first reference time is later than the second reference time), the controller 508 stays in State B. If not, the controller 508 compares the stored second reference time (i.e., the time that tracking device 606 began moving after the most recent confirmation signal was received) to a threshold length of time; if the threshold length of time has passed since the second stored reference time, the controller transitions 730 to State C.

The threshold length of time for determining whether to transition 730 to State C can be set by the user or by the tracking system 600. For example, if the user attaches the tracking device 606 to an important person or thing, like a child or a pet, the user can set the tracking device 606 to transition 730 to State C after a relatively short length of time, e.g., 15 minutes or an hour. The short threshold time may affect battery life of the tracking device 606, but the user may determine that a shorter battery life is worth the security of being able to locate the tracking device 606 quickly, even in a communicatively-restricted environment. On the other hand, if the user attaches the tracking device 606 to a less important object, like a gym bag, the user can set the tracking device 606 to transition 730 to State C after a longer length of time, e.g., one day.

In some embodiments, the tracking system 600 can learn thresholds for tracking devices 606 based on a user's habits and transmit the thresholds to the tracking devices 606. The learned thresholds can include a threshold time and rules for applying the threshold times, e.g., times of day or days of the week during which a learned threshold should be applied. As an example, the tracking device 606 is attached to a user's house keys. The tracking system 600 can learn that during the day, the user usually keeps his house keys in range of his mobile device 602. The tracking system 600 can also learn that overnight (e.g., from 11 pm to 7 am), the tracking device 606 usually disconnects from the mobile device 602 (e.g., because the user turns off his mobile device 602 overnight) and the user's home has no community mobile device 604 within range. Based on this pattern, the tracking system 600 can determine that during the daytime, the tracking device 606 should transition 730 to State C after a relatively short period of time (e.g., 1 hour). However, the tracking device 606 should not apply this threshold overnight, when the tracking device 606 does not expect to be able to communicate with any mobile devices 602 and 604. Accordingly, the tracking system 600 can transmit a daytime threshold of 1 hour, along with the hours during which the tracking device 606 should apply this threshold, e.g., 7 am to 11 pm.

In general, the threshold time is used to determine whether the most recent location for the tracking device 606 received by the tracking system 600 is stale beyond a tolerable amount. In other embodiments, the controller 508 uses one or more other reference times, threshold times, or other rules to determine whether or not the most recent location is stale or incorrect, and whether or not to transition to State C.

When the tracking device 606 is in State C: Sense and Report 715, if the tracking device 606 is able to reach a mobile device 602 or 604 using the BLE transceiver 504, the controller 508 transitions 735 back to State B: Community Find 710. For example, during State C, the BLE transceiver 504 can continue to transmit beacon signals, e.g., on a periodic basis. If the tracking device 606 receives a confirmation signal from a community mobile device 604, the controller 508 transitions 735 to State B. If the tracking device 606 receives a signal from the user's mobile device 602, the controller 508 may transition directly from State C to State A: User Device Proximity 705 and pair with the mobile device 602.

In an alternate embodiment, the controller 508 transitions the tracking device 606 to State B after the tracking device 606 successfully reports location information to the tracking system 600, even if the tracking device 606 has not reached a mobile device 602 or 604 with the BLE transceiver 504. For example, the tracking device 606 may receive a confirmation from the tracking system 600 that the tracking system 600 has received the reported location information. In response to the confirmation, the controller 508 transitions 735 back to State B. The controller 508 may reset the reference time based on this confirmation signal and compare the elapsed time since the new reference time to a threshold length of time to determine whether or not to transition back into State C. The threshold may be the same threshold time or a different threshold time from the threshold time used to transition into State C after losing connection with a mobile device, described above. In some embodiments, the controller 508 transitions back into State C after detecting movement.

FIG. 7B is a state diagram for a tracking device that enters an alternate locating state in response to a "wake" signal, according to one embodiment. The state diagram shows three states: State A: User Device Proximity 755, State B: Community Find 760, and State C: Sense and Report 765; these states are similar to State A: User Device Proximity 705, State B: Community Find 710, and State C: Sense and Report 715 shown in FIG. 7A. The state diagram also shows the conditions for the tracking device 606 to transition between the three states. The transition 770 from State A to State B and the transition 775 from State B to State A are similar to the transitions 720 and 725, respectively, shown in FIG. 7A.

In the embodiment shown in FIG. 7B, the controller 508 transitions 780 from State B to State C in response to receiving a "wake" signal from the tracking system 600. The wake signal can be a signal transmitted via the third network 612 (e.g., via the stationary device 614) and received by the alternate transceiver 506. In one embodiment, while the tracking device 606 is in State B, the alternate transceiver 506 is operating in a low-power mode that is receptive to wake signals. In another embodiment, while the tracking device 606 is in State B and is able to communicate with one or more community mobile devices 604, the alternate transceiver 506 is turned off. Upon determining that the tracking device 606 is in a communicatively-restricted environment (e.g., no confirmation signals have been received for a threshold length of time), the controller 508 instructs the alternate transceiver 506 to enter a low power mode in which the alternate transceiver 506 can receive a wake signal from the tracking system 600.

The tracking system 600 can transmit the wake signal after determining that the tracking device 606 is in a communicatively-restricted environment, e.g., if the tracking system 600 has not received a location update from a community mobile device 604 for the tracking device 606 for a threshold length of time. As described with respect to FIG. 7A, the tracking system 600 can receive or learn different thresholds or threshold rules specific to different tracking devices 606. The tracking system 600 can use learned thresholds and timing rules to determine when to send wake signals in a manner similar to that described above.

As in FIG. 7A, when the tracking device 606 is in State C: Sense and Report 765, if the tracking device 606 connects to any mobile device 602 or 604, the controller 508 transitions 785 back to State B: Community Find 760. Alternatively, as described above, the controller 508 may transition 785 to State B immediately after the tracking device 606 reports its location to the tracking system 600. If the tracking device 606 receives a signal from the user's mobile device 602, the controller 508 may transition directly from State C to State A: User Device Proximity 755 and pair with the mobile device 602.

In addition to receiving "wake" signal from the tracking system 600, the tracking device 606 may also receive a "found" signal from the tracking system 600 and transition 785 to State B in response to the "found" signal. In this embodiment, the tracking system 600 may receive an indication from the mobile device 602 that the user has located the tracking device 606. This indication may be generated and transmitted automatically, e.g., in response to the mobile device 602 entering the range of the tracking device 606. Alternatively, the indication may be transmitted in response to user input to the mobile device 602 that the tracking device 606 is safe, e.g., because the user knows that the tracking device 606 is in a safe place, a friend or family member has collected the tracking device 606, etc.

Figure 8A:
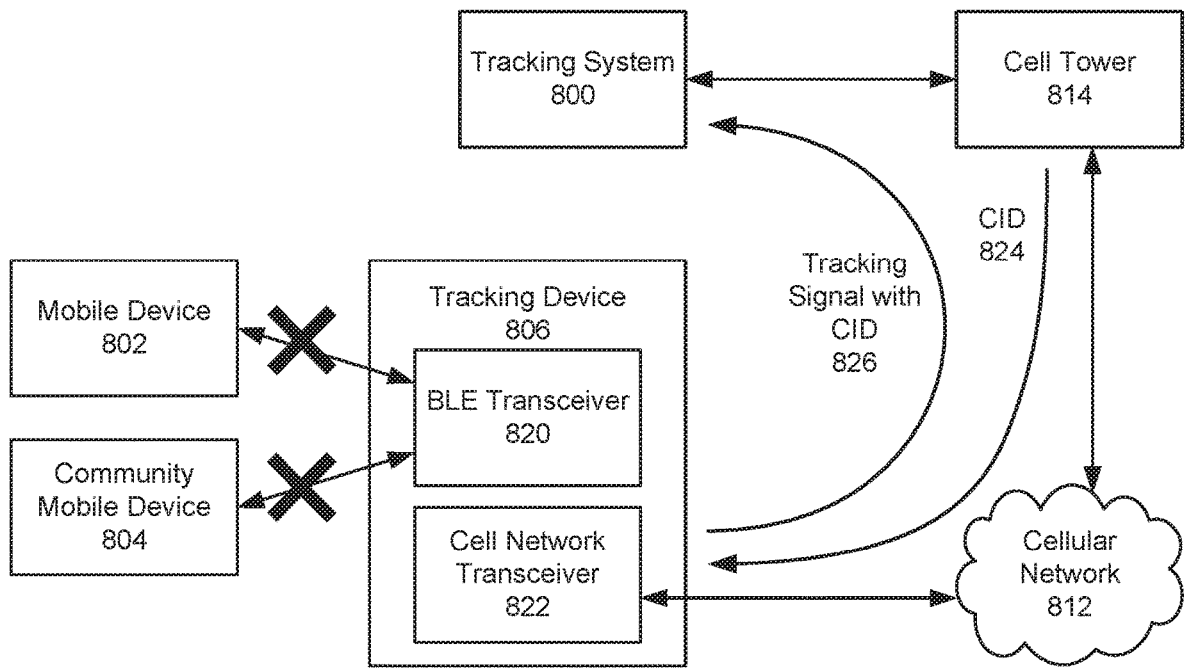
FIG. 8A illustrates communications between a tracking device, a cell tower, and a tracking system in one alternate locating state, according to one embodiment.
Figure 8B:
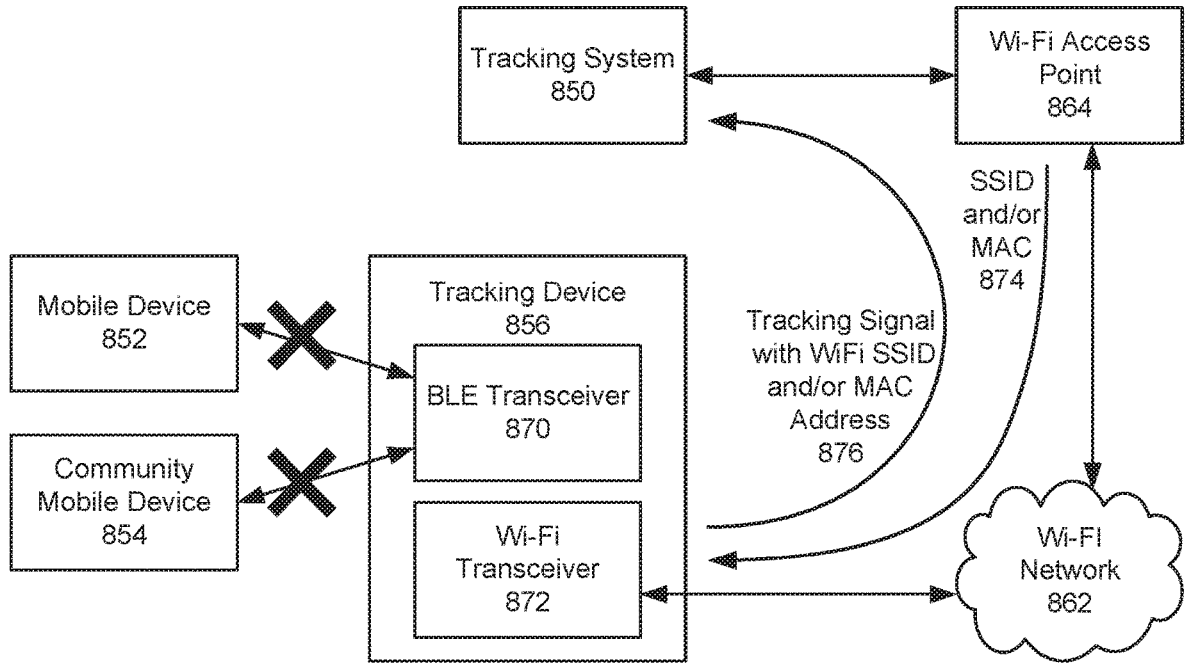
FIG. 8B illustrates communications between a tracking device, a Wi-Fi access point, and a tracking system in another alternate locating state, according to one embodiment.

FIGS. 8A and 8B show two exemplary block diagrams of alternate locating states, e.g., State C: Sense and Report 715 or 765. FIG. 8A illustrates communications between a tracking device, a cell tower, and a tracking system in one alternate locating state in which the tracking device communicates over a cellular network, according to one embodiment. FIG. 8A includes a tracking system 800, a mobile device 802 associated with a tracking device 806, a community mobile device 804, a cellular network 812, and a cell tower 814. The tracking system 800, mobile device 802, and community mobile device 804 are similar to the tracking system 100 or 600, mobile device 102 or 602, and community mobile device 104 or 604 described with respect to FIGS. 1 through 7B. The tracking device 806 is an embodiment of the tracking device 106 or 606 described with respect to FIGS. 5 through 7B. The cellular network 812 is an embodiment of the third network 612, and the cell tower 814 is an embodiment of the stationary device 614.

The tracking device 806 includes a BLE transceiver 820, which is similar to the BLE transceiver 504, and a cell network transceiver 822, which is an embodiment of the alternate transceiver 506. The BLE transceiver 820 is not able to communicate with the mobile device 802 or a community mobile device 804, as indicated by the "X's" in FIG. 8A. The tracking device 806 is operating in a Sense and Report state, in which the cell network transceiver 822 senses location information and reports this location information to the tracking system 800. As discussed with respect to FIGS. 7A and 7B, the tracking device 806 may have transitioned into the Sense and Report state based on internal rules of the tracking device 806 or based on receiving a wake signal from the tracking system 800 over the cellular network 812. In the Sense and Report state, the cell network transceiver 822 receives the CID 824 identifying the cell tower 814 that is broadcast by the cell tower 814. In some embodiments, the cell network transceiver 822 receives multiple CIDs from multiple cell towers within range of the tracking device 806.

The cell network transceiver 822 of the tracking device 806 transmits a tracking signal 826 that includes the CIDs 824 to the tracking system 800. In some embodiments, the tracking signal 826 includes additional information about the signals received from the cell towers, such as a signal strength or time of receipt. In some embodiments, if the cell network transceiver 822 receives multiple CIDs, the tracking device 806 can select a subset of the CIDs to include in the tracking signal 826, e.g., the CIDs of the four strongest signals, or the CIDs of the signals above a threshold strength. The tracking signal 826 travels via the cellular network 812 to the cell tower 814. The cell tower can forward the tracking signal 826 via the cellular network 812 and/or one or more other networks.

The tracking system 800 determines the location of the tracking device 806 by looking up the locations associated with the cell towers in the stationary device database 218. If the tracking system 800 receives an identifier for one cell tower, the tracking system 800 can estimate the location of the tracking device 806 as the location of the cell tower, or can provide a range location range in which the tracking device 806 is likely to be located based on the cell tower and signal strength. If the tracking signal 826 includes multiple CIDs, the tracking system 800 can triangulate the location of the tracking device 806 to estimate a more accurate location of the tracking device 806.

FIG. 8B illustrates communications between a tracking device, a Wi-Fi access point, and a tracking system in another alternate locating state in which the tracking device communicates over a Wi-Fi network, according to one embodiment. FIG. 8B includes a tracking system 850, a mobile device 852 associated with a tracking device 856, a community mobile device 854, a Wi-Fi network 862, and a Wi-Fi access point 864. The tracking system 850, mobile device 852, and community mobile device 854 are similar to the tracking system 100 or 600, mobile device 102 or 602, and community mobile device 104 or 604 described with respect to FIGS. 1 through 7B. The tracking device 856 is an embodiment of the tracking device 106 or 606 described with respect to FIGS. 5 through 7B. The Wi-Fi network 862 is an embodiment of the third network 612, and the Wi-Fi access point 864 is an embodiment of the stationary device 614.

The tracking device 856 includes a BLE transceiver 870, which is similar to the BLE transceiver 504, and a Wi-Fi transceiver 872, which is an embodiment of the alternate transceiver 506. The BLE transceiver 870 is not able to communicate with the mobile device 852 or a community mobile device 854, as indicated by the "X's" in FIG. 8B. The tracking device 856 is operating in a Sense and Report state, in which the Wi-Fi transceiver 872 senses location information and reports this location information to the tracking system 850. As discussed with respect to FIGS. 7A and 7B, the tracking device 856 may have transitioned into the Sense and Report state based on internal rules of the tracking device 856 or based on receiving a wake signal from the tracking system 850 over the Wi-Fi network 862. In the Sense and Report state, the Wi-Fi transceiver 872 receives a SSID and/or MAC address 874 identifying the Wi-Fi access point 864 that is broadcast by the Wi-Fi access point 864. In some embodiments, the Wi-Fi transceiver 872 receives multiple SSIDs and/or MAC addresses from multiple Wi-Fi access points within range of the tracking device 856.

The Wi-Fi transceiver 872 of the tracking device 856 transmits a tracking signal 876 that includes the SSID and/or MAC address of the Wi-Fi access point 864 to the tracking system 850. In some embodiments, the tracking signal 876 includes additional information about the signals received from the Wi-Fi access points, such as a signal strength or time of receipt. In some embodiments, if the Wi-Fi transceiver 872 receives multiple broadcast Wi-Fi signals, the tracking device 856 can select a subset of the SSIDs and/or MAC addresses to include in the tracking signal 876, e.g., the identifiers of the four strongest signals, or any signals above a threshold strength. The tracking signal 876 travels via the Wi-Fi network 862 to the Wi-Fi access point 864. The Wi-Fi access point 864 can forward the tracking signal 876 via the Wi-Fi network 862 and/or one or more other networks.

The tracking system 850 determines the location of the tracking device 856 by looking up the locations associated with the MAC addresses and/or SSIDs in the stationary device database 218. If the tracking system 850 receives an identifier for one stationary device, the tracking system 850 can estimate the location of the tracking device 856 as the location of the stationary device, or can provide a range of the stationary device as a region in which the tracking device 856 is within. If the tracking signal 876 includes multiple Wi-Fi access point, the tracking system 850 can calculate a more accurate estimate of the location of the tracking device 856.

In some embodiments, a tracking device includes both a Wi-Fi transceiver 872 and a cell network transceiver 822. The tracking device can use both networks to sense location data and report location data, or the tracking device can select one network based on availability, accuracy, battery consumption, or other factors. Wi-Fi access points can generally provide a more precise location estimate but may be more error-prone because they can be moved to a different location. In an example, the tracking device tries to sense location data using both the Wi-Fi transceiver and the cell network transceiver. If at least one Wi-Fi access point is within range, the tracking device uses the Wi-Fi transceiver to transmit a tracking signal including both the SSID and/or MAC address of the Wi-Fi access points within range and the CIDs of the cell towers within range via a Wi-Fi access point. If no Wi-Fi access points are within range, the tracking device uses the cell network transceiver to transmit a tracking signal including the CIDs of the cell tower within range via one of the cell towers.

Figure 9:
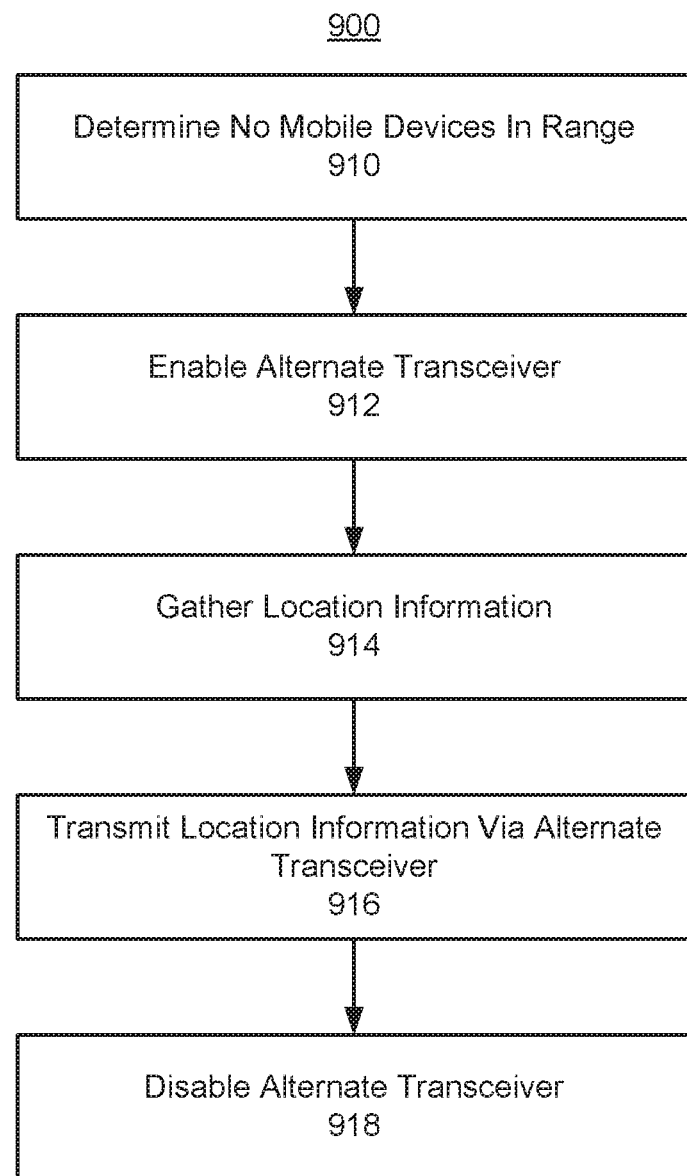
FIG. 9 is a flow chart illustrating a process for providing a locating signal in an alternate locating state, according to one embodiment.

FIG. 9 is a flow chart illustrating a process 900 for providing a locating signal in an alternate locating state, according to one embodiment. In other embodiments, the process 900 may include additional steps not shown in FIG.

9, and some of the steps in the process 900 may be omitted or performed in a different order.

The tracking device 606 determines 910 that no mobile devices are within range of the tracking device 606. For example, the tracking device may determine that a time since a confirmation signal was received from a community mobile device exceeds a threshold length of time, indicating that the tracking device 606 is in a communicatively-restricted environment.

In response to the determination 910, the tracking device 606 enables 912 an alternate transceiver. For example, the tracking device 606 enables the alternate transceiver 506, which may be a cell network transceiver 822 or a Wi-Fi transceiver 872.

The tracking device 606 gathers 914 location information for the tracking device 606. For example, the tracking device 606 can determine its own location, e.g., using GPS signals received at a GPS 512. Alternatively, the tracking device 606 can gather identifying information for devices in its vicinity, such as CIDs or Wi-Fi SSIDs or MAC addresses.

The tracking device 606 transmits 916 the gathered location information via the alternate transceiver 916. The gathered location information is sent via an alternate network (e.g., a cell network or a Wi-Fi network) to the tracking system 600 so that the tracking system 600 and, in turn, the user of the mobile device 602 can locate the tracking device 606 based on the location information.

After transmitting the gathered location information, the tracking device 606 disables 918 the alternate transceiver. In some embodiments, the tracking device 606 disables the alternate transceiver after the tracking device 606 returns to the Community Find or User Device Proximity state, in which a mobile device is within range of the tracking device 606. In other embodiments, the tracking device 606 disables the alternate transceiver after a successful transmission of the location information, and re-enables the alternate transceiver after a threshold length of time passes, in response to the tracking device 606 detecting movement, or some other triggering event.

Figure 10:
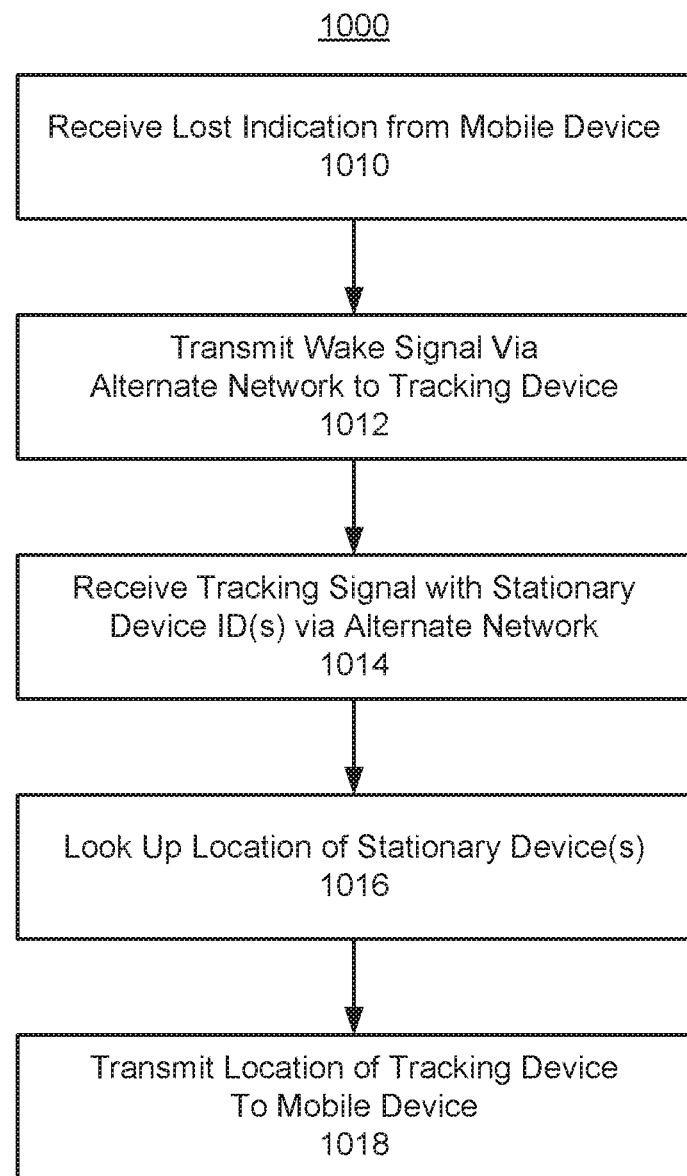
FIG. 10 is a flow chart illustrating a process for retrieving a location signal from a tracking device using an alternate locating state of the tracking device, according to one embodiment.

FIG. 10 is a flow chart illustrating a process 1000 for retrieving a location signal from a tracking device using an alternate locating state of the tracking device, according to one embodiment. In other embodiments, the process 1000 may include additional steps not shown in FIG. 10, and some of the steps in the process 1000 may be omitted or performed in a different order.

The tracking system 600 receives a lost indication from a mobile device 602. For example, a user may input to the mobile device 602 a request that the mobile device 602 send an indication that the tracking device 606 is lost to the tracking system 600, and the tracking system 600 receives this indication.

The tracking system 600 transmits 1012 a wake signal via an alternate network to the tracking device 606. For example, the tracking system 600 may determine that the tracking device 606 is in a communicatively-restricted environment, e.g., because the tracking system 600 has not received location information for the tracking device 606 from any community mobile devices 604 during at least a threshold length of time. In response, the tracking system 600 transmits the wake signal via an alternate network over which the tracking device 606 can receive wake signals, e.g., a cell network or a Wi-Fi network.

The tracking system 600 receives 1014 a tracking signal that includes one or more stationary device IDs from the tracking device 606 via the alternate network. In response to the wake signal, the tracking device 606 gathered the stationary device IDs (e.g., CIDs or Wi-Fi MAC addresses and/or SSIDs) from the surrounding stationary devices in the alternate network.

The tracking system 600 looks up 1016 the locations of the stationary devices based on the received stationary device IDs, e.g., by referencing the stationary device database 218. If the tracking signal includes multiple stationary device IDs, the tracking system 600 can use the locations of the stationary devices to determine an estimated location of the tracking device 606.

The tracking system 600 transmits 1018 the location of the tracking device 606 to the mobile device 602. The user of the mobile device 602 can use this location to find the lost tracking device 606.

Although steps 1010-1018 of FIG. 10 are described as being performed on the tracking system 600, some or all of the steps of these steps may alternatively be performed on the mobile device 602.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A tracking device comprising:
   a first transceiver configured to transmit a first tracking signal for locating the tracking device to at least one of a plurality of mobile devices via a first network, the plurality of mobile devices configured to provide the first tracking signal to a tracking server;
   a second transceiver configured to transmit a second tracking signal for locating the tracking device to the tracking server via a second network, the second network different from the first network; and
   control logic configured to:
      configure the tracking device to operate in a first state wherein the first transceiver transmits the first tracking signal and wherein the second transceiver is disabled and does not transmit the second tracking signal; and
      in response to determining that the tracking device has transmitted a threshold number of signals without receiving a response from a mobile device of the plurality of mobile devices, configure the tracking device to operate in a second state wherein the second transceiver is enabled and transmits the second tracking signal.

2. The tracking device of claim 1, wherein the tracking device is configured to operate in the second state further in response to receiving a wakeup signal from the tracking server via the second network.

3. The tracking device of claim 1, wherein the threshold number of signals is selected based on a historic behavior of the tracking device.

4. The tracking device of claim 1, wherein the second transceiver is turned off when the tracking device is configured to operate in the first state, and wherein configuring the tracking device to operate in the second state comprises turning the second transceiver on.

5. The tracking device of claim 1, wherein the threshold number of signals is selected based on a most recent detected location of the tracking device.

6. The tracking device of claim 1, the second transceiver further configured to:
   receive, from a stationary device via the second network, an identifier of the stationary device; and
   transmit the identifier of the stationary device in the second tracking signal, wherein the identifier of the stationary device is used by the tracking server to determine a location associated with the tracking device.

7. The tracking device of claim 1, wherein the tracking device is configured to, when configured to operate in the second state, determine a geographical location of the tracking device, and wherein the second transceiver is further configured to transmit the geographical location of the tracking device in the second tracking signal.

8. The tracking device of claim 1, the control logic further configured to:
   determine that the second tracking signal has been successfully transmitted to the tracking server; and
   in response to the successful transmission, configuring the tracking device to operate in the first state.

9. The tracking device of claim 1, the control logic further configured to:
   receive a confirmation signal from one of the plurality of mobile devices that the first tracking signal was received, the first tracking signal transmitted while the tracking device is configured to operate in the second state; and
   in response to receiving the confirmation signal, configure the tracking device to operate in the first state wherein the second transceiver is disabled and does not transmit the second tracking signal.

10. The tracking device of claim 1, wherein:
    the tracking device further comprises a third transceiver configured to receive information for locating the tracking device; and
    the control logic further is configured to include the information for locating the tracking device in the second tracking signal transmitted by the second transceiver.

11. A method for locating a tracking device comprising:
    configuring the tracking device to operate in a first state, wherein the tracking device, when configured to operate in the first state, transmits signals for locating the tracking device with a first transceiver via the first network, and wherein a second transceiver of the tracking device is disabled when the tracking device is configured to operate in the first state;
    determining that the tracking device has transmitted a threshold number of signals with the first transceiver via the first network without receiving a response from at least one of a plurality of mobile devices; and
    in response to determining that the tracking device has transmitted the threshold number of signals without receiving the response from at least one of the plurality of mobile devices, configuring the tracking device to operate in a second state, wherein the tracking device, when configured to operate in the second state, enables the second transceiver and transmits a second tracking signal for locating the tracking device with the second transceiver via a second network different from the first network.

12. The method of claim 11, wherein the tracking device is configured to operate in the second state further in response to receiving a wakeup signal from a tracking server via the second network.

13. The method of claim 11, wherein the threshold number of signals is selected based on a historic behavior of the tracking device.

14. The method of claim 11, wherein the threshold number of signals is selected based on a most recent detected location of the tracking device.

15. The method of claim 11, further comprising:
receiving, from a stationary device via the second network, an identifier of the stationary device; and
transmitting the identifier of the stationary device in the second tracking signal, wherein the identifier of the stationary device is used by a tracking server to determine a location associated with the tracking device.

16. The method of claim 11, wherein the tracking device is configured to, when configured to operate in the second state, determine a geographical location of the tracking device, and wherein the second transceiver is further configured to transmit the geographical location of the tracking device in the second tracking signal.

17. The method of claim 11, further comprising:
determining that the second tracking signal has been successfully transmitted to a tracking server; and
in response to the successful transmission, configuring the tracking device to operate in the first state.

18. The method of claim 11, further comprising:
receiving a response from one of the plurality of mobile devices while the tracking device is configured to operate in the second state; and
in response to receiving the response, configure the tracking device to operate in the first state wherein the second transceiver is disabled and does not transmit the second tracking signal.

19. The method of claim 11, wherein the tracking device further comprises a third transceiver configured to receive information for locating the tracking device, and wherein the information for locating the tracking device is included in the second tracking signal.

20. A non-transitory computer-readable storage medium storing instructions for locating a tracking device that, when executed by a processor, cause the processor to perform steps comprising:

configuring the tracking device to operate in a first state, wherein the tracking device, when configured to operate in the first state, transmits signals for locating the tracking device with a first transceiver via the first network, and wherein a second transceiver of the tracking device is disabled when the tracking device is configured to operate in the first state;

determining that the tracking device has transmitted a threshold number of signals with the first transceiver via the first network without receiving a response from at least one of a plurality of mobile devices; and in response to determining that the tracking device has transmitted the threshold number of signals without receiving the response from at least one of the plurality of mobile devices, configuring the tracking device to operate in a second state, wherein the tracking device, when configured to operate in the second state, enables the second transceiver and transmits a second tracking signal for locating the tracking device with the second transceiver via a second network different from the first network.

* * * * *